US011340582B2

(12) United States Patent
Wright et al.

(10) Patent No.: US 11,340,582 B2
(45) Date of Patent: May 24, 2022

(54) PROCESSING 3D OBJECT MODELS

(71) Applicant: HEWLETT-PACKARD DEVELOPMENT COMPANY, L.P., Spring, TX (US)

(72) Inventors: Jake Wright, San Diego, CA (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 113 days.

(21) Appl. No.: 16/605,230

(22) PCT Filed: Oct. 14, 2017

(86) PCT No.: PCT/US2017/056686
§ 371 (c)(1),
(2) Date: Oct. 15, 2019

(87) PCT Pub. No.: WO2019/074528
PCT Pub. Date: Apr. 18, 2019

(65) Prior Publication Data
US 2020/0233400 A1 Jul. 23, 2020

(51) Int. Cl.
G05B 19/4093 (2006.01)
B33Y 50/00 (2015.01)
B29C 64/386 (2017.01)

(52) U.S. Cl.
CPC ...... G05B 19/40932 (2013.01); B29C 64/386 (2017.08); B33Y 50/00 (2014.12);
(Continued)

(58) Field of Classification Search
CPC .... G05B 19/40932; G05B 2219/35145; G05B 2219/49023; B33Y 50/00; B33Y 10/00; B33Y 50/02; B29C 64/386; Y02P 90/02
See application file for complete search history.

(56) References Cited

U.S. PATENT DOCUMENTS 6,621,914 B1 * 9/2003 Bornowski ............ G01S 17/89
356/3
7,848,571 B2 * 12/2010 Ratner ................ G06V 10/457
382/173
(Continued)

FOREIGN PATENT DOCUMENTS

WO WO2011098609 A1 8/2011
WO WO2016119885 A1 8/2016
(Continued)

OTHER PUBLICATIONS

Shin, "An Efficient Classification and Rendering Method Using Tagged Distance Maps", Sep. 15, 2004, Springer-Verlag (Year: 2004).*
(Continued)

Primary Examiner — Rocio Del Mar Perez-Velez
Assistant Examiner — Christopher W Carter
(74) Attorney, Agent, or Firm — Dierker & Kavanaugh PC; Nathan Rieth

(57) ABSTRACT

In an example implementation, a method of processing a 3D object model includes receiving render data of a 2D slice of a 3D object model and generating distance values indicating how far away voxels in the 2D slice are from a nearest edge of the 3D object model. The method also includes detecting a feature of the 3D object model from the distance values, and generating modified render data to be subsequently used in a 3D printing system to produce the feature in a 3D part.

13 Claims, 6 Drawing Sheets

(52) U.S. Cl.
CPC ............. *G05B 2219/35145* (2013.01); *G05B 2219/49023* (2013.01)

(56) References Cited

U.S. PATENT DOCUMENTS

| | | | |
|---|---|---|---|
| 2004/0130546 A1* | 7/2004 | Porikli | G06T 7/11 345/423 |
| 2004/0202990 A1* | 10/2004 | Geiger | G06T 19/00 434/262 |
| 2008/0232718 A1* | 9/2008 | Avinash | H04N 19/132 382/305 |
| 2010/0045674 A1* | 2/2010 | Clifton | G06T 5/20 345/424 |
| 2014/0031967 A1 | 1/2014 | Unger et al. | |
| 2014/0324204 A1 | 10/2014 | Vidimce et al. | |
| 2015/0024337 A1* | 1/2015 | Blassnig | H04N 5/2256 433/29 |
| 2015/0078641 A1* | 3/2015 | Tan | G06T 7/12 382/131 |
| 2016/0257077 A1 | 9/2016 | Brown | |
| 2016/0339636 A1 | 11/2016 | De Pena et al. | |
| 2017/0368755 A1* | 12/2017 | Bader | G05B 19/4099 |
| 2018/0017956 A1* | 1/2018 | Garcia Reyero Vinas | B29C 64/386 |
| 2018/0240263 A1* | 8/2018 | Courter | G06T 15/005 |
| 2018/0365889 A1* | 12/2018 | Bisson | G06T 17/00 |

FOREIGN PATENT DOCUMENTS

| | | |
|---|---|---|
| WO | WO-2016169617 A1 | 10/2016 |
| WO | WO2016169617 A1 | 10/2016 |
| WO | WO2016200384 A1 | 12/2016 |
| WO | WO2017127061 A1 | 7/2017 |
| WO | WO-2017/147412 | 8/2017 |

OTHER PUBLICATIONS

HP Multi Jet Fusion Technology: How Does It Work?, Mar. 24, 2017, http://www.3dprinttherapy.com/blog/tag/prints/.

* cited by examiner

PROCESSING 3D OBJECT MODELS

BACKGROUND

Additive manufacturing processes can produce three-dimensional (3D) objects by providing a layer-by-layer accumulation and solidification of build material patterned from digital 3D object models. In some examples, build material such as powdered nylon can be processed using heat to cause melting and solidification of the material in selected regions of each layer. In some examples, the solidification of powdered build material can be accomplished in other ways, such as through the use of binding agents or chemicals. The solidification of selected regions of powdered build material can form 2D cross-sectional layers of the 3D object being produced, or printed.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
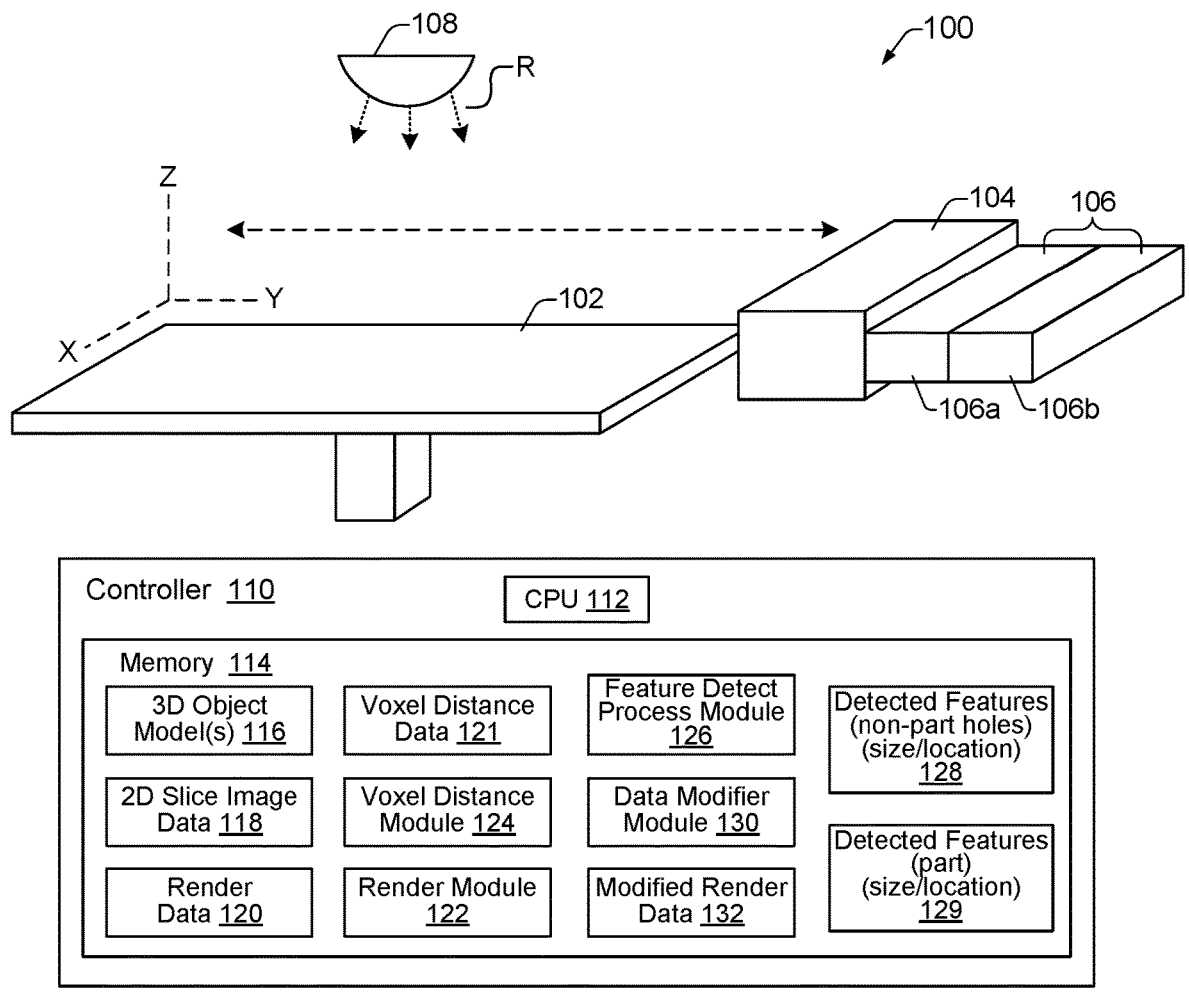
FIG. 1 shows a basic block diagram of an example of a 3D printing system suitable for detecting small features in 3D object models.

In some example 3D printing processes, 3D objects or parts can be formed on a layer-by-layer basis where each layer is processed and combined with a subsequent layer until the 3D object is fully formed. The terms 'part' and 'object' and their variants may be used interchangeably throughout this description. A 3D object being printed can be patterned from a digital 3D object model. Information in a 3D object model, such as geometric information that describes the shape of the 3D model, can be stored as plain text or binary data in various 3D file formats, such as STL, VRML, OBJ, FBX, COLLADA, 3MF, and so on. Some 3D file formats can store additional information about 3D object models, such as colors, textures, mechanical properties, and material types.

The information in a 3D object model can define solid portions of a 3D object to be printed. To produce a 3D object from a 3D object model, the 3D model information can be processed to provide 2D planes or slices of the 3D model. Prior to being rendered as discussed herein below, each 2D slice generally comprises an image and/or data that can define an area or areas of a respective layer of build material (e.g., powder) as being solid part areas where the powder is to be solidified during a 3D printing process. Areas of a powder layer that are not defined as part areas by a 2D slice, comprise non-part areas where the powder is not to be solidified. Thus, the powder located in non-part areas such as holes, gaps, and slots, will not be solidified in a 3D printing process. Furthermore, the powder located in non-part areas that are fully outside the borders of the part will not be solidified in a 3D printing process. For example, areas of powder that extend from a part border to the edge of the powder layer will not be solidified. While build material is generally referred to herein as powdered build material, such as powdered nylon, there is no intent to limit the build material that may be used in producing a 3D object from a 3D object model. Other forms and types of build materials may be appropriate and are contemplated herein, such as short fibers that have been cut into short lengths from long strands or threads of material or otherwise formed, and various powder and powder-like materials including plastics, ceramics, metals, and the like.

In some example powder-based and fusing agent 3D printing systems, layers of powdered build material can be spread over a platform or print bed within a work area. A fusing agent can be selectively applied to each powder layer in areas where the particles of powdered material are to be fused together or solidified to form the part. A detailing agent can be selectively applied around part contours to improve the part resolution. As discussed in more detail below, in some examples detailing agent can be applied in and around non-part areas to help preserve holes, gaps, or other non-part areas during fusing of the part. Detailing agents can include various fluids such as water, silicon, oil, or other fluids that can be applied to the powder or other build material to thermally or mechanically inhibit the powder from fusing, for example, as other nearby powder areas are being fused. Each layer in the work area can be exposed to a fusing energy to thermally fuse together the particles of powdered material where the fusing agent has been applied. The process can then be repeated, one layer at a time, until a 3D part or 3D parts have been formed within the work area.

As noted above, each 2D slice of a 3D object model indicates areas within a respective powder layer that are to be solidified or fused during a 3D printing process. Subsequent rendering of the 2D slices can provide render data for each respective powder layer that instructs a 3D printer which areas of the powder layer are to become part areas, and which areas are to become non-part areas. More specifically, the render data from each 2D slice of the 3D object model provides a binary indication as to whether each voxel location in a powder layer is to be a part or a non-part. For example, the render data may be a one (1) for voxel locations that are to be part locations, and it may be a zero (0) for voxel locations that are to be non-part locations. Thus, for each 2D powder layer, a 3D printing system can use the render data for that layer to apply fusing agent to the part areas and detailing agent to the non-part areas, so that when fusing energy is applied, the part areas are fused and the non-part areas are not fused.

While this general process of applying agents and fusing energy to powder layers is useful for printing most 3D objects, it may not be adequate to accurately reproduce and/or preserve some smaller features that may be present in some 3D object models. Small features can include, for example, small part features such as posts or other protrusions on a part, as well as small non-part features such as small holes, gaps, slots, and other open areas of a part.

However, the 2D slice render data does not provide information that distinguishes or identifies these small features that may be present within part areas and non-part areas. Instead, as noted above, the 2D slice render data merely instructs a 3D printer which areas of a powder layer are to be part areas and non-part areas. Thus, the 3D printer can be effectively unaware of small feature areas that may be better preserved through additional processing, such as applying more detailing agent. Moreover, the render data does not distinguish between non-part areas that are within the borders of the part and non-part areas that are fully outside the borders of the part. In some examples, this can result in an over application of detailing agent to non-part areas that are fully outside the borders of a part. For example, the application of detailing agent to powder over larger, non-part areas that surround the border of a part can cause the borders to be over cooled, which can result in warped borders. The application of detailing agent in such non-part areas can also cause powder splashing, which can bounce powder out of position and cause clogging in the agent dispensing nozzles.

Accordingly, example methods and systems described herein enable the determination of feature sizes in 3D object models to facilitate a more accurate reproduction of such features in printed 3D objects. In general, preserving and/or accurately reproducing small features can involve additional processing, such as increasing the amount of detailing agent being applied to the powder in areas where there will be small holes or gaps in a part. The size of both positive (part) and negative (non-part; e.g., holes, gaps) features of a 3D printed part can be determined from distance data associated with each voxel of a 3D part. A distance value generated and associate with each voxel represents the distance (in voxels) between the voxel and the nearest part border. Local maximum distance values can be determined and analyzed to provide the location and size of both positive (part) and negative (non-part) features. This enables the detection of small holes and gaps inside of parts that can be processed with the application of higher densities or amounts of detailing agent. Identifying the precise centers of such small hole features, as well as their sizes (voxel radius), allows higher amounts of detailing agent to be applied to both the insides of detected holes and to small areas of the part that surround the holes. The detailing agent can prevent overfusing of powder and the closing of such small holes and gaps that may otherwise occur due to heat conduction from the surrounding part.

The detection of small positive (part) features additionally allows for the preservation and protection of such small features from other processes that may occur within a 3D printing system. For example, in some 3D printing systems, parts can be produced slightly larger than their 3D object model indicates in order to accommodate for their shrinkage as they cool. This can be done, for example, by enlarging the object model to compensate for the shrinkage. In some examples an erosion process can then be implemented to help improve the general accuracy of the part's size. However, for small part features such as a small post connected to a larger 3D part, for example, such a process can weaken the small feature. This can result in the feature being removed, for example, during a subsequent cleaning process. The ability to detect small features can enable 3D print modes that are accurate for both large and small features simultaneously. In general, powder-based, fusing agent 3D printing systems are discussed herein as example systems for determining feature sizes in 3D object models to facilitate a more accurate reproduction of such features in printed 3D objects. However, the processing of 3D object models to determine feature sizes according to examples described herein is not limited to powder-based fusing agent 3D printing systems, but may also be applicable to other additive manufacturing and 3D printing systems such as chemical binder systems, metal type 3D printing systems, and so on.

In a particular example, a method of processing a 3D object model includes receiving render data of a 2D slice of a 3D object model and generating distance values indicating how far away voxels in the 2D slice are from a nearest edge of the 3D object model. The method also includes detecting a feature of the 3D object model from the distance values, and generating modified render data to be subsequently used in a 3D printing system to produce the feature in a 3D part.

In another example, a 3D printing system for processing a 3D object model includes a memory to receive a 3D object model for printing a part, and voxel distance data that indicates distance values to an edge of the part for voxels of the 3D object model. The system also includes a processor programmed with a feature detection process to detect a feature of the part based on the voxel distance data, and programmed to modify printing render data based on the detected feature.

In another example, a method of processing a 3D object model includes determining a distance value for each voxel in a 2D slice of the 3D object model. The distance value indicates a number of voxel units of distance to a nearest edge of a part to be printed from the 3D object model. The method also includes recording a feature at an XY coordinate of a current voxel if the current voxel has a distance value greater than distance values of a threshold number of surrounding comparison voxels. The distance value of the current voxel can be recorded as a radius size of the feature.

FIG. 1 shows a basic block diagram of an example of a 3D printing system 100 suitable for detecting small features in 3D object models. The 3D printing system 100 is shown by way of example only and is not intended to represent a complete 3D printing system. Thus, it is understood that an example system 100 may comprise additional components and perform additional functions not specifically illustrated or discussed herein.

An example 3D printing system 100 includes a moveable print bed 102, or build platform 102 to serve as the floor to a work space in which 3D objects can be printed. In some examples the build platform 102 can move in a vertical direction (i.e., up and down) in the Z axis direction. A powdered build material distributor 104 can provide a layer of powder over the build platform 102. The powder distributor 104 can include a powder supply and powder spreading mechanism such as a roller or blade to move across the platform 102 in the Y axis direction to spread a layer of powder. A liquid agent dispenser 106 can deliver a fusing agent and/or detailing agent from a fusing agent dispenser 106*a* and detailing agent dispenser 106*b*, respectively, in a selective manner onto areas of a powder layer provided on the build platform 102. Liquid agent dispensers 106 can include, for example, a printhead or printheads, such as thermal inkjet or piezoelectric inkjet printheads. The 3D printing system 100 also includes a fusing energy source 108, such as radiation source 108, that can apply radiation R to powder layers on platform 102 to facilitate the heating and fusing of the powder. In some examples, the energy source 108 can comprise a scanning energy source that scans across the platform 102 in the Y axis direction.

The example 3D printing system 100 additionally includes an example controller 110. The controller 110 can control various operations of the printing system 100 to facilitate the printing of 3D objects as generally described herein, such as controllably spreading powder onto platform 102, selectively applying fusing agent and detailing agent to portions of the powder, and exposing the powder to radiation R. In addition, the controller 110 can control the processing of a 3D object model to enable the detection of small features in the model and the modification of a 3D printing process to enable the accurate reproduction of the small features.

As shown in FIG. 1, an example controller 110 can include a processor (CPU) 112 and a memory 114. The controller 110 may additionally include other electronics (not shown) for communicating with and controlling various components of the 3D printing system 100. Such other electronics can include, for example, discrete electronic components and/or an ASIC (application specific integrated circuit). Memory 114 can include both volatile (i.e., RAM) and nonvolatile memory components (e.g., ROM, hard disk, optical disc, CD-ROM, magnetic tape, flash memory, etc.). The components of memory 114 comprise non-transitory, machine-readable (e.g., computer/processor-readable) media that can provide for the storage of machine-readable coded program instructions, data structures, program instruction modules, JDF (job definition format), and other data and/or instructions executable by a processor 112 of the 3D printing system 100.

An example of executable instructions to be stored in memory 114 include instructions associated with modules 122, 124, 126, and 130, while an example of stored data includes data stored in modules 116, 118, 120, 121, 128, and 132. In general, modules 122, 124, 126, and 130, include programming instructions executable by processor 112 to cause the 3D printing system 100 to perform operations related to processing a 3D object model to detect small features in the model and modifying print data to enable the 3D printing system 100 to accurately reproduce the small features in a 3D printed object. Such operations can include, for example, the operations of methods 1100 and 1200, described below with respect to FIGS. 11 and 12, respectively.

Figure 2:
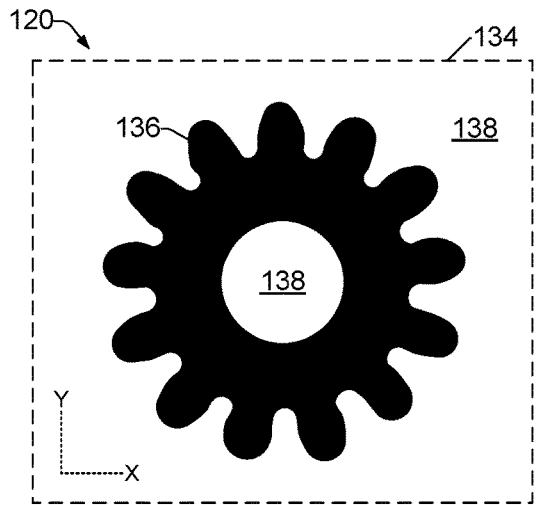
FIG. 2 shows an example of render data generated from a single 2D slice of an example 3D object model.

FIG. 2 shows an example of render data 120 generated from a single 2D slice 118 of an example 3D object model 116, illustrated as a circular gear component with gear teeth around its perimeter. The example render data 120 comprises print data to control 3D printing system 100. The example render data 120 can be generated, for example, by the controller 110 executing instructions from a render module 122. The example render data 120 comprises an image that provides binary information. The binary information indicates to the 3D printing system 100 those areas of a corresponding powder layer 134 that will become part areas 136, shown in black, and those areas that will become non-part areas 138, shown in white. In some examples, the render data 120 can be expressed in other ways, such as in a table of binary data, where 1's can represent part areas 136 and 0's can represent non-part areas 138, for example. Each voxel location in the powder layer 134 can be identified by an XY coordinate, or by a row and column number, and the voxel locations can be designated as being within the part areas 136 or the non-part areas 138.

Figure 3:
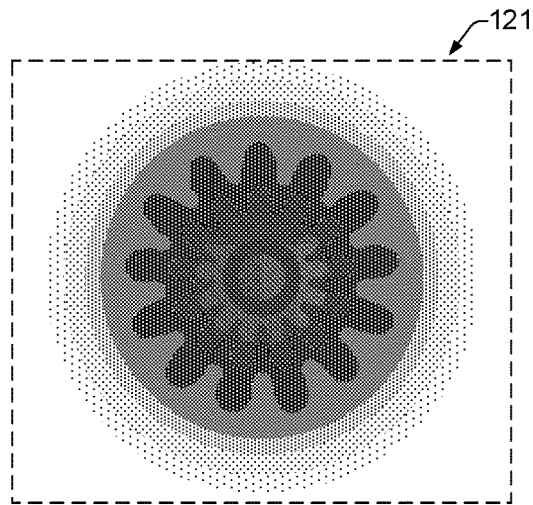
FIG. 3 shows example voxel distance data that indicates how far each voxel is away from the nearest border of the part.

FIG. 3 shows example voxel distance data 121 that indicates how far each voxel is away from the nearest border of the part. The example voxel distance data 121 can be generated, for example, by the controller 110 executing instructions from a voxel distance module 124. Referring to FIG. 2, each voxel in the powder layer 134 is a certain number of voxels away from a nearest border of the part 136. Some voxels in the powder layer 134 are located directly on a border of the part 136. The distance that a current voxel is away from a nearest border of the part 136 is intended to be illustrated in FIG. 3 as a grayscale value from 0 to 255. For the purpose of illustration, FIG. 2 and FIG. 3 are shown at different scales. That is, FIG. 3 is shown on a smaller scale that FIG. 2. A voxel located on a border of the part 136 will have a distance value of 0, which has a corresponding grayscale shade of black. As voxels in the powder layer 134 get farther away from the border of the part 136, their distance values increase toward a maximum of 255, and their corresponding grayscale shades get lighter. Thus, the cloudy appearance in FIG. 3 is intended to illustrate different voxel distance values (grayscale numbers) that increase toward 255 as voxels within the layer 134 get farther away from the border of the part 136. In some examples, the voxel distance data 121 can be expressed in other ways, such as in a table of integer numbers that range between 0 and 255, where 0 represents a voxel that is on the border of a part 136, and 255 represents a voxel that is at least 255 voxels away from the nearest part border. Each voxel location in the powder layer 134 can be identified by an XY coordinate, or by a row and column number, and each voxel location can be associated in the table with an integer value between 0 and 255 to indicate how far the voxel is from the nearest part border.

Figure 4:
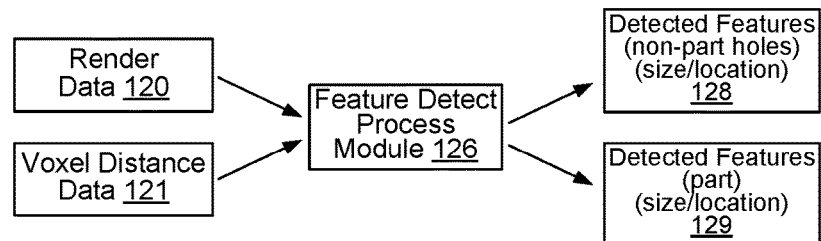
FIG. 4 shows inputs to an example feature detection process and outputs from the example feature detection process.

As shown in FIG. 4, the render data 120 shown in FIGS. 1 and 2, and the voxel distance data 121 shown in FIGS. 1 and 3, provide inputs to a feature detection process 126. A feature detection process 126 can be implemented by a controller 110 executing instructions from a feature detection process module 126. The feature detection process 126 is discussed below with respect to FIGS. 7-10. As shown in FIG. 4, the outputs of the feature detection process 126 include features that have been detected in a 3D object model 116. More specifically, using print render data 120 for a 2D data slice 118 of a 3D object model 116, and voxel distance data 121 generated from the 2D data slice, the feature detection process 126 can detect features 128 that comprise non-part features such as holes, gaps, or slots. The feature detection process 126 can also detect features 129 that comprise solid part features. A data modifier module 130 (FIG. 1) can execute to generate modified render data 132 (FIG. 1) based on the detected features 128, 129. Modified render data 132 can be used to alter a 3D printing process in the 3D printing system 100, for example, by increasing an amount of detailing agent printed on or applied in the area of the detected features.

Figure 5:
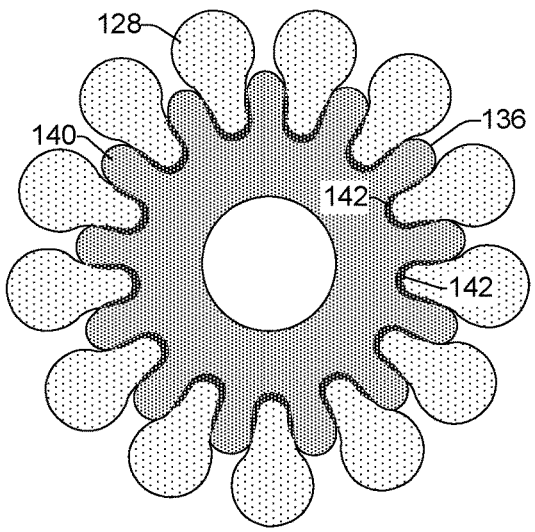
FIG. 5 shows examples of non-part features detected by a feature detection process from example voxel distance data and example render data.

FIG. 5 shows examples of non-part features 128 detected by the feature detection process 126 from the example voxel distance data 121 and render data 120. FIG. 5 illustrates the contour of the part 136 shown in FIG. 2, and the detected non-part features 128. The non-part features 128 detected on the part 136 comprise gaps 128 detected between the gear teeth 140 of the part 136. FIG. 5 also shows modified areas 142 of the detected gap features 128 that have been altered (e.g., using modified render data 132) to preserve the gap features 128. At the narrowest part of each gap 128, the modified areas 142 show that additional processing is being applied to ensure that the gap features 128 are preserved so that they do not close up due to thermal bleed from the fusing of the part 136. The additional processing applied at the modified areas 142 can include the application of increased amounts of detailing agent on and around the modified areas 142 to prevent powder in the gaps 128 from fusing. Increased amounts of detailing agent can include amounts of detailing agent that are adjustable based on the size and/or shape of a given small feature (e.g., a part feature or a non-part feature) in order to preserve the small feature, for example, by preventing the fusing of powder within a small feature hole or gap. In some examples, the additional processing at the modified areas 142 can include additional contour rendering in the modified areas 142 to adjust the contour of the part 136 to widen the gaps 128 at the narrowest part of each gap to preserve the gap and keep it from closing up during fusing of the part 136. The additional processing performed at the modified areas 142 of the detected gap features 128 can be implemented as modified render data 132 (FIG. 1), generated by a controller 110 executing instructions from a data modifier module 130 in accordance with non-part features 128 detected by the feature detection process 126. As discussed below with reference to FIGS. 7-10, non-part features 128 such as holes and gaps can be rendered as circles with center points at detected XY locations and radii sizes based on detected local maximum voxel distance values.

Figure 6:
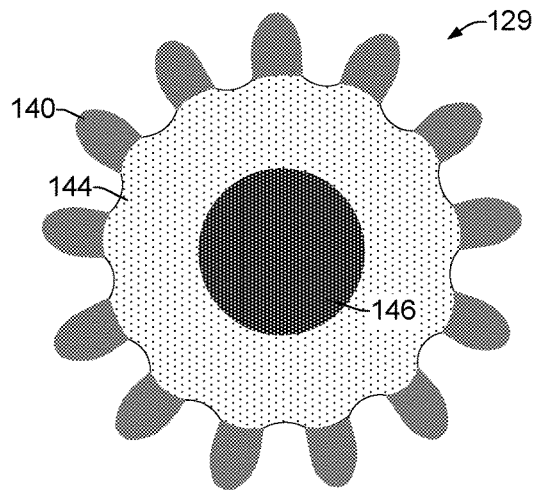
FIG. 6 shows examples of part features detected by a feature detection process from example voxel distance data and example render data.

FIG. 6 shows examples of part features 129 detected by the feature detection process 126 from the example voxel distance data 121 and render data 120. In general, darker shaded areas of FIG. 6 indicate smaller detected part features, such as the gear teeth 140, while lighter shaded areas indicate larger part features, such as the gear wheel 144. The darkest shaded areas appear where no features are detected, such as in the center hole 146 area of the gear. Referring generally to FIGS. 5 and 6, the feature detection process 126 distinguishes large parts from small parts and identifies small non-part areas such as small holes and gaps.

Figure 7:
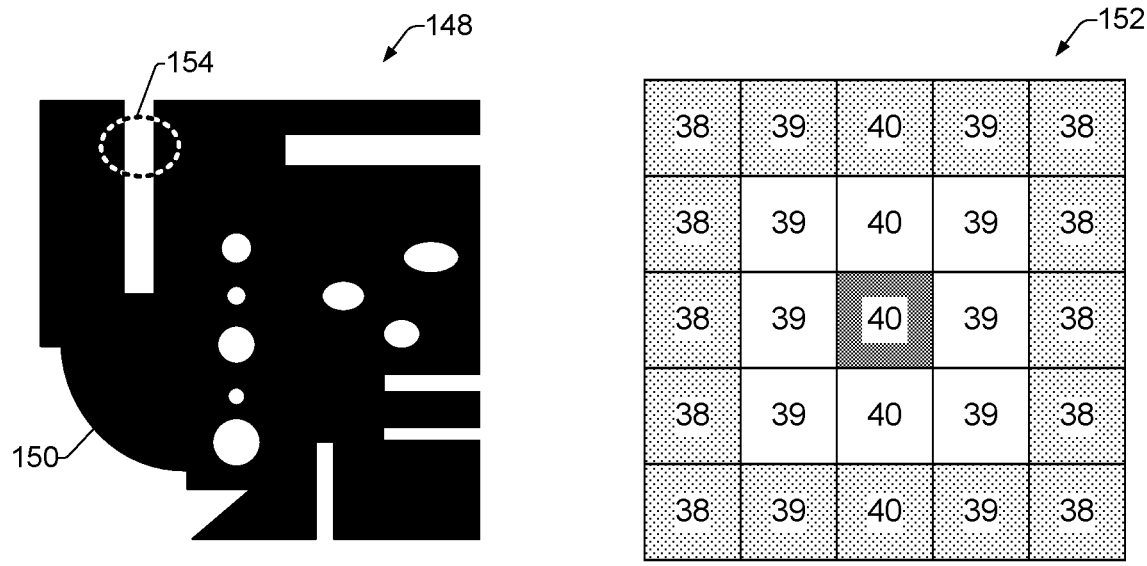
FIGS. 7-10 show example operations of a feature detection process to detect different part features and non-part features.

FIGS. 7-10 show examples of how the feature detection process 126 executes (e.g., on a controller 110) to detect various part features and non-part features. FIG. 7, for example, shows how the feature detection process 126 can be used to detect a non-part slot feature. FIG. 7 shows the render data 148 of a 2D slice of an example part 150 (i.e., a 3D object model 116), and the voxel distance data 152 for a group of adjacent voxels in the render data 148. In general, the feature detection process 126 detects features by analyzing the distance value for each voxel. For example, voxel distance values for each 2D slice or part layer can be analyzed moving from left to right and from top to bottom, such as one reads a book. Analyzing the distance value of each voxel in this manner, the feature detection process 126 detects features by locating voxels whose distance values are local maximum values. The process 126 records the coordinate location (eg., XY coordinates; row and column numbers) of each local maximum distance voxel as being the center of a feature. The process 126 also records the local maximum distance value of the voxel as the radius size of the feature.

Referring still to FIG. 7, the distance data 152 for a group of voxels is shown. The feature detection process 126 analyzes the voxel distance data 152 in a given orientation. While different orientations are possible, one efficient orientation is to analyze voxels within a certain comparison kernel size. Larger or smaller comparison kernel sizes can be used for detected features. While larger kernels process more slowly, they demonstrate less angular dependence than smaller kernels. A particular kernel size of 2 has been shown to balance the performance and output quality of the feature detection process 126.

Using a comparison kernel size of 2, therefore, the distance value of a current voxel is compared to the distance values of each voxel within a 2 voxel radius of the current voxel. The voxels within the 2 voxel radius can be referred to as comparison voxels. As shown in FIG. 7, a current voxel at the center of the voxel distance data values 152 has a distance value of 40. This distance value is compared to the distance values of each comparison voxel within a 2 voxel radius, which in this example is all the voxels around the perimeter of the distance data values 152.

The feature detection process 126 determines that a feature is present when the distance value of the current voxel is greater than a threshold number of the comparison voxels. In this example, where a comparison kernel size of 2 voxel units has been used, the number of comparison voxels is 16. That is, there are 16 voxels within 2 voxel units of the current voxel at the center of the distance data values 152 shown in the FIG. 7 example. An example threshold number of comparison voxels to use for XY feature detection is 9 voxels. Threshold values less than 9 voxels have been shown to result in false positives (i.e., detection of features where there are none), and values greater than 9 voxels have been shown to result in false negatives (i.e., features may not be detected on some angles).

Referring still to FIG. 7, when the threshold number of comparison voxels is set to 9 voxels, the feature detection process 126 determines that a feature is present at the current voxel location. This is because the current voxel's distance value of 40 is greater than the distance values of 14 of the 16 surrounding comparison voxels, which is greater than the threshold of at least 9 comparison voxels. Therefore, the feature detection process 126 records that a feature is present at the coordinate location of the current voxel (eg., XY coordinates; row and column numbers). The feature detection process 126 records both the coordinate location of the current voxel, and the current voxel's local maximum distance value of 40 as being the radius size of the feature.

While a feature location and size can be recorded based on the voxel distance data 152, the type of feature detected is not yet known. To determine whether the detected feature is a part feature 129 or a non-part feature 128, the feature detection process 126 accesses the render data 148 to determine what binary information is present or stored at the coordinate location of the detected feature. The binary information stored in the render data 148 at the coordinate location of the detected feature indicates whether the detected feature is a part feature 129 or a non-part feature 128 (e.g., a hole, gap, etc.). Referring to the render data 148 in FIG. 7, the coordinate location of the detected feature is within the slot area 154, as noted above. Therefore, the detected feature in the FIG. 7 example is a non-part feature that refers to the slot area 154.

The detected feature in FIG. 7 can be rendered as a circle having a radius of 40 voxel units and a center located at the XY location of the current voxel where the feature was detected. For example, a controller 110 executing instructions from a data modifier module 130 can generate modified render data 132 that applies additional processing such as added detailing agent at the XY location of the feature, and extending the added detailing agent to cover the radius of 40 voxel units or more from the center of the feature. Other detected features such as those discussed below with reference to FIGS. 8 and 9 can be rendered in a similar manner.

Figure 8:
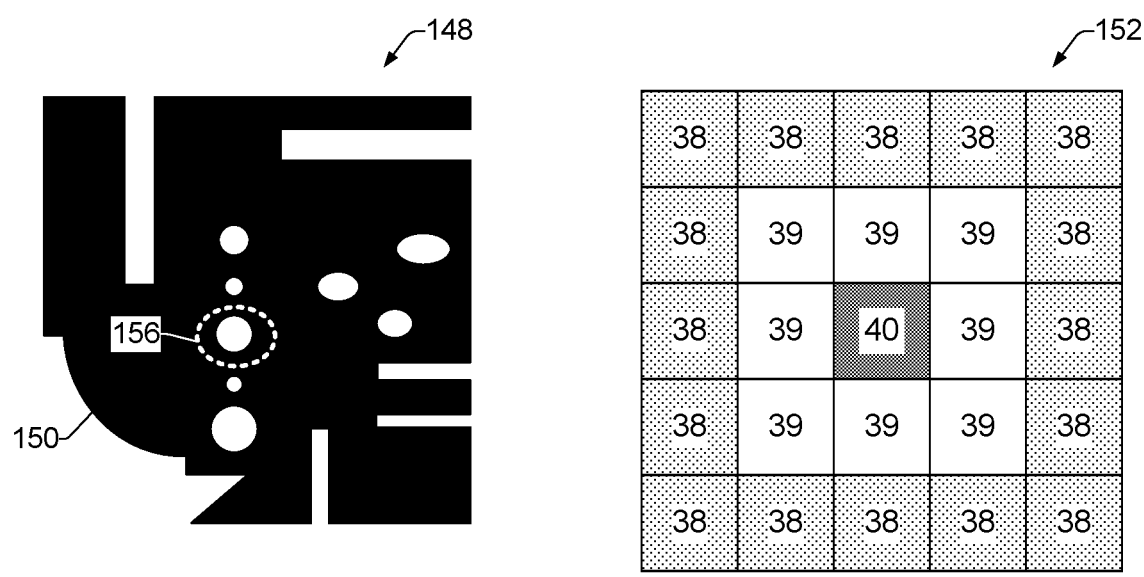

Referring now to FIG. 8, the feature detection process 126 can execute in a similar way to detect a non-part hole feature 156. Referring to the voxel distance data 152 of FIG. 8, the current voxel being analyzed (at the center of the distance data 152) has a distance value of 40. Comparing this distance value with distance values of the 16 comparison voxels within a 2 voxel comparison kernel indicates that the distance value of the current voxel is greater than the distance values of all 16 of the comparison voxels. Therefore, a feature with a center radius size of 40 voxel units is recorded at the coordinate location of the current voxel. The feature detection process 126 then accesses the render data 148 to determine that the current voxel location is in a non-part location (i.e., a hole).

Figure 9:
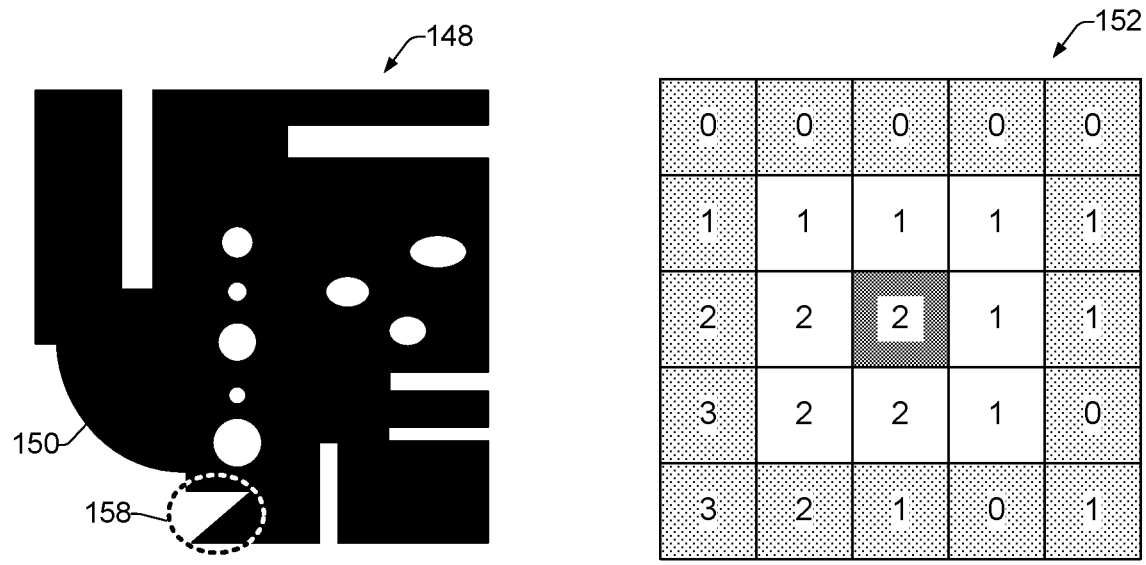

Referring now to FIG. 9, the feature detection process 126 can execute in a similar way to detect a non-part converging geometry such as a wedge or corner feature 158. Referring to the voxel distance data 152 of FIG. 9, the current voxel being analyzed (at the center of the distance data 152) has a distance value of 2. Comparing this distance value with distance values of the 16 comparison voxels within a 2 voxel comparison kernel indicates that the distance value of the current voxel is greater than the distance values of 12 of the comparison voxels. Therefore, a feature with a center radius size of 2 voxel units is recorded at the coordinate location of the current voxel. The feature detection process 126 then accesses the render data 148 to determine that the current voxel location is in a non-part location (i.e., outside corner).

Figure 10:
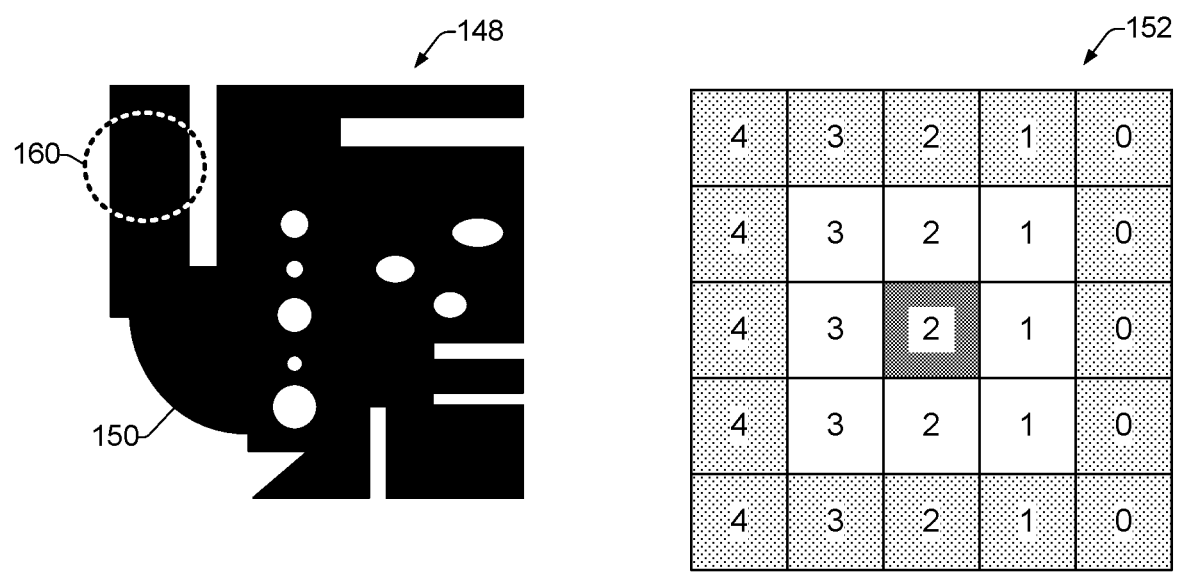

Referring now to FIG. 10, an example is shown where the feature detection process 126 can execute to determine that a non-part area outside of the edge or border 160 of a part is not a small feature that should receive additional processing. Referring to the voxel distance data 152 of FIG. 10, the current voxel being analyzed (at the center of the distance data 152) has a distance value of 2. Comparing this distance value with distance values of the 16 comparison voxels within a 2 voxel comparison kernel indicates that the distance value of the current voxel is greater than the distance values of 7 of the comparison voxels. Because the feature detection threshold is set to 9 comparison voxels, the current voxel being analyzed will not be recorded as a detected feature. In effect, the feature detection process 126 functions in this example to prevent an over application of detailing agent onto the large powder areas outside the edge of the part.

Figure 11:
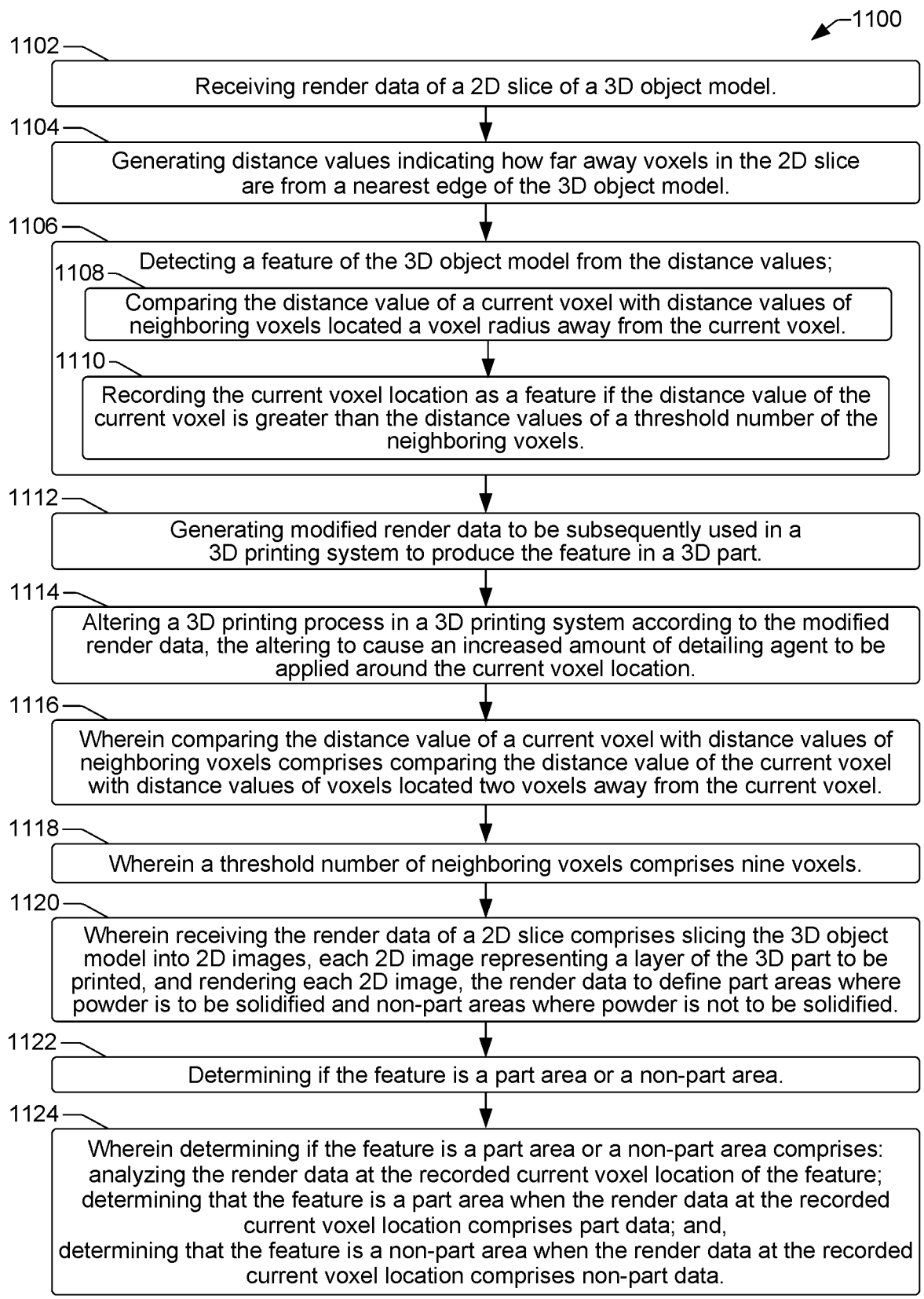
FIGS. 11 and 12 are flow diagrams showing example methods of processing a 3D object model.
Figure 12:
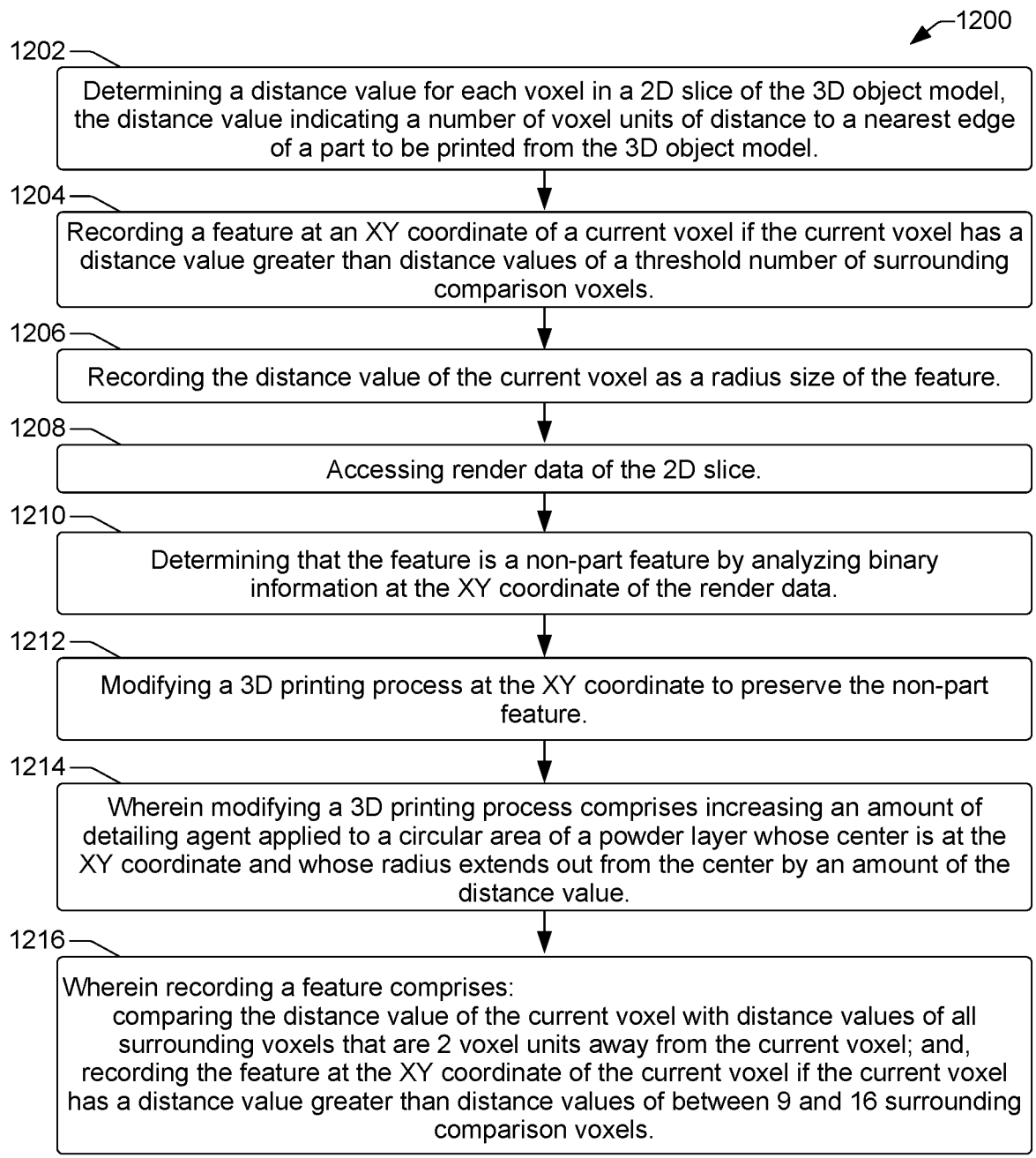

FIGS. 11 and 12 are flow diagrams showing example methods 1100 and 1200 of processing a 3D object model. Methods 1100 and 1200 are associated with examples discussed above with regard to FIGS. 1-10, and details of the operations shown in methods 1100 and 1200 can be found in the related discussion of such examples. The operations of methods 1100 and 1200 may be embodied as programming instructions stored on a non-transitory, machine-readable (e.g., computer/processor-readable) medium, such as memory/storage 114 shown in FIG. 1. In some examples, implementing the operations of methods 1100 and 1200 can be achieved by a controller, such as a controller 110 of FIG. 1, reading and executing the programming instructions stored in a memory 114. In some examples, implementing the operations of methods 1100 and 1200 can be achieved using an ASIC and/or other hardware components alone or in combination with programming instructions executable by a controller 110.

The methods 1100 and 1200 may include more than one implementation, and different implementations of methods 1100 and 1200 may not employ every operation presented in the respective flow diagrams of FIGS. 11 and 12. Therefore, while the operations of methods 1100 and 1200 are presented in a particular order within their respective flow diagrams, the order of their presentations is not intended to be a limitation as to the order in which the operations may actually be implemented, or as to whether all of the operations may be implemented. For example, one implementation of method 1100 might be achieved through the performance of a number of initial operations, without performing other subsequent operations, while another implementation of method 1100 might be achieved through the performance of all of the operations.

Referring now to the flow diagram of FIG. 11, an example method 1100 of processing a 3D object model begins at block 1102 with receiving render data of a 2D slice of a 3D object model. The method 1100 can continue at block 1104 with generating distance values indicating how far away voxels in the 2D slice are from a nearest edge of the 3D object model. As shown at block 1106, the method 1100 includes detecting a feature of the 3D object model from the distance values. In some examples as shown at blocks 1108 and 1110, respectively, detecting a feature can include comparing the distance value of a current voxel with distance values of neighboring voxels located a voxel radius away from the current voxel, and recording the current voxel location as a feature if the distance value of the current voxel is greater than the distance values of a threshold number of the neighboring voxels. As shown at block 1112, the method 1100 can include generating modified render data to be subsequently used in a 3D printing system to produce the feature in a 3D part. The method 1100 can include altering a 3D printing process in a 3D printing system according to the modified render data, where the altering is to cause an increased amount of detailing agent to be applied around the current voxel location, as shown at block 1114. In some examples, comparing the distance value of a current voxel with distance values of neighboring voxels comprises comparing the distance value of the current voxel with distance values of voxels located two voxels away from the current voxel, as shown at block 1116. In some examples, a threshold number of neighboring voxels comprises nine voxels, as shown at block 1118.

In some examples, as shown at block 1120, receiving the render data of a 2D slice comprises slicing the 3D object model into 2D images, where each 2D image represents a layer of the 3D part to be printed, and rendering each 2D image, where the render data is to define part areas where powder is to be solidified and non-part areas where powder is not to be solidified. As shown at block 1122, the method 1100 can also include determining if the feature is a part area or a non-part area. In some examples, as shown at block 1124, determining if the feature is a part area or a non-part area can include analyzing the render data at the recorded current voxel location of the feature, determining that the feature is a part area when the render data at the recorded current voxel location comprises part data, and determining that the feature is a non-part area when the render data at the recorded current voxel location comprises non-part data.

Referring now to the flow diagram of FIG. 12, an example method 1200 of processing a 3D object model begins at block 1202 with determining a distance value for each voxel in a 2D slice of the 3D object model. The distance value indicates a number of voxel units of distance to a nearest edge of a part to be printed from the 3D object model. The method 1200 can include recording a feature at an XY coordinate of a current voxel if the current voxel has a distance value greater than distance values of a threshold number of surrounding comparison voxels, as shown at block 1204. As shown at block 1206, the method 1200 also includes recording the distance value of the current voxel as a radius size of the feature. The method 1200 can include accessing render data of the 2D slice, as shown at block 1208. As shown at block 1210, the method can include determining that the detected feature is a non-part feature by analyzing binary information at the XY coordinate of the render data. A 3D printing process can be modified at the XY coordinate to preserve the non-part feature, as shown at block 1212. In some examples, modifying a 3D printing process comprises increasing an amount of detailing agent applied to a circular area of a powder layer whose center is at the XY coordinate, and whose radius extends out from the center by an amount of the distance value, as shown at block 1214. As shown at block 1216, in some examples recording a feature can include comparing the distance value of the current voxel with distance values of all surrounding voxels that are 2 voxel units away from the current voxel, and recording the feature at the XY coordinate of the current voxel if the current voxel has a distance value greater than distance values of between 9 and 16 surrounding comparison voxels.

What is claimed is:

1. A method of processing a 3D object model comprising:
receiving render data of a 2D slice of a 3D object model;
generating distance values indicating how far away voxels in the 2D slice are from a nearest edge of the 3D object model;
detecting a feature of the 3D object model from the distance values, the detecting comprising;
for a current voxel, selecting a comparison kernel size to determine comparison voxels located a particular voxel radius away from the current voxel;
comparing the distance value of the current voxel with the distance value of each comparison voxel; and,
recording the current voxel location as the feature when the distance value of the current voxel is greater than the distance values of a threshold number of the comparison voxels;
generating modified render data based on the detected feature; and,
controlling a 3D printing system with the modified render data to produce the feature in a 3D part.

2. A method as in claim 1, further comprising altering a 3D printing process in the 3D printing system according to the modified render data, the altering to cause an increased amount of detailing agent to be applied around the current voxel location.

3. A method as in claim 1, wherein comparing the distance value of a current voxel with distance values of neighboring voxels comprises comparing the distance value of the current voxel with distance values of voxels that are located two voxels away from the current voxel.

4. A method as in claim 1, wherein a threshold number of neighboring voxels comprises nine voxels.

5. A method as in claim 1, wherein receiving the render data of a 2D slice of a 3D object model comprises:
slicing the 3D object model into 2D images, each 2D image representing a layer of the 3D part to be printed; and
rendering each 2D image, the render data for each 2D image to define part areas where powder is to be solidified and non-part areas where powder is not to be solidified.

6. A method as in claim 5, further comprising determining if the feature is a part area or a non-part area.

7. A method as in claim 6, wherein determining if the feature is a part area or a non-part area comprises:
analyzing the render data at the recorded current voxel location of the feature;
determining that the feature is a part area when the render data at the recorded current voxel location comprises part data; and,
determining that the feature is a non-part area when the render data at the recorded current voxel location comprises non-part data.

8. A three-dimensional (3D) printing system for processing a 3D object model, comprising:
a memory to receive a 3D object model for printing a part, and voxel distance data that indicates distance values to an edge of the part for voxels of the 3D object model; and,
a processor programmed with a feature detection process to detect a feature of the part based on the voxel distance data, the feature detection process to compare the distance value of a current voxel with the distance value of each of a number of comparison voxels located a particular voxel radius away from the current voxel, to record the current voxel location as the feature when the distance value of the current voxel is greater than the distance values of a threshold number of the comparison voxels, and to modify printing render data based on the detected feature, the processor further programmed to control a 3D printing system with the modified printing render data to produce the detected feature.

9. A 3D printing system as in claim 8, further comprising:
a detailing agent dispenser to apply an increased amount of detailing agent onto build material at an XY location of the detected feature location based on the modified printing render data.

10. A method of processing a 3D object model comprising:
determining a distance value for each voxel in a 2D slice of the 3D object model, the distance value indicating a number of voxel units of distance to a nearest edge of a part to be printed from the 3D object model;
comparing the distance value of a current voxel with the distance value of each of a number of surrounding comparison voxels located a particular voxel radius away from the current voxel;
recording a feature at an XY coordinate of the current voxel when the current voxel has a distance value greater than the distance values of a threshold number of the surrounding comparison voxels;
recording the distance value of the current voxel as a radius size of the feature;
determining that the feature is a non-part feature by analyzing binary information at the XY coordinate of render data of the 2D slice;
modifying the render data based on the non-part feature; and,
printing the part according to the modified render data.

11. A method as in claim 10, wherein printing the part comprises:
modifying a 3D printing process at the XY coordinate to preserve the non-part feature.

12. A method as in claim 11, wherein modifying a 3D printing process comprises increasing an amount of detailing agent applied to a circular area of a powder layer whose center is at the XY coordinate and whose radius extends out from the center by an amount of the distance value.

13. A method as in claim 10, wherein recording a feature comprises:
comparing the distance value of the current voxel with distance values of all surrounding voxels that are 2 voxel units away from the current voxel; and, recording the feature at the XY coordinate of the current voxel if the current voxel has a distance value greater than distance values of between 9 and 16 surrounding comparison voxels.

* * * * *